United States Patent [19]

Navazo

[11] Patent Number: 5,629,496
[45] Date of Patent: May 13, 1997

[54] DEVICE FOR ADAPTING AN ELECTRICAL MECHANISM TO A RACEWAY MEANS FOR ELECTRICAL CONDUCTORS

[75] Inventor: Juan M. B. Navazo, Barcelona, Spain

[73] Assignee: Aparellaje Electrico, S.A., Barcelona, Spain

[21] Appl. No.: 269,781

[22] Filed: Jul. 1, 1994

[30] Foreign Application Priority Data

Jul. 5, 1993 [ES] Spain ..................... 9301500

[51] Int. Cl.[6] ..................... H02G 3/04
[52] U.S. Cl. ............. 174/48; 174/50; 174/50.54; 174/63; 174/68.3; 174/70 R; 52/220.5; 220/3.9
[58] Field of Search ............... 174/48, 49, 50, 174/52.1, 50.54, 58, 63, 68.3, 70 R, 97, 101; 52/220.5, 220.8; 220/3.3, 3.9

[56] References Cited

U.S. PATENT DOCUMENTS

| | | | |
|---|---|---|---|
| 2,602,832 | 7/1952 | Brennan | 174/50.54 X |
| 3,303,264 | 2/1967 | Saul et al. | 174/78 |
| 4,134,636 | 1/1979 | Kleinatland et al. | 220/3.9 X |
| 4,323,723 | 4/1982 | Fork et al. | 174/48 |
| 4,507,900 | 4/1985 | Landis | 174/48 X |
| 5,300,731 | 4/1994 | DeBaratolo, Jr. et al. | 174/48 |

FOREIGN PATENT DOCUMENTS

| | | | |
|---|---|---|---|
| 202640 | 11/1986 | European Pat. Off. | |
| 239456 | 9/1987 | European Pat. Off. | |
| 241325 | 10/1987 | European Pat. Off. | |
| 403440 | 12/1990 | European Pat. Off. | 174/101 X |
| 496667 | 7/1992 | European Pat. Off. | 174/97 X |
| 4103957 | 8/1992 | Germany | 174/48 X |
| 2299409 | 12/1990 | Japan | 174/101 X |
| 2137025 | 9/1984 | United Kingdom | |
| 2266414 | 10/1993 | United Kingdom | 174/101 X |
| 9419852 | 9/1994 | WIPO | 174/68.3 X |

Primary Examiner—Kristine L. Kincaid
Assistant Examiner—Dean A. Reichard
Attorney, Agent, or Firm—Staas & Halsey

[57] ABSTRACT

The device includes a support member; a casing; and a closing and covering member. The support member may be attached to an external member and may receive an electrical mechanism. The support member is provided with a coupling mechanism to the casing and this coupling allows access of conductors from a raceway device. The casing is prismatic in shape and is adapted to surround the support member and the electrical mechanism. The casing is provided with a bight in one side wall thereof. The closing and covering member has a wall portion and a hood portion. The wall portion may be attached to the edges of the bight to close it. The hood portion covers a portion of the raceway device. Where necessary, a guide member is attached to a portion of the raceway device and is covered by the hood portion.

7 Claims, 4 Drawing Sheets

DEVICE FOR ADAPTING AN ELECTRICAL MECHANISM TO A RACEWAY MEANS FOR ELECTRICAL CONDUCTORS

FIELD OF THE INVENTION

The invention relates to a device for adapting an electrical mechanism to a raceway means for electrical conductors, particularly to a raceway means formed by: a base section having a bottom wall and side walls having respective longitudinal grooves, and by a lid section having two inwardly directed lips for engagement in said longitudinal grooves.

The invention is particularly applicable to small sized raceway means. In these cases, the electrical mechanisms, such as for example, a socket, a switch, a change-over switch, a safety or protection appliance, etc, have to be installed alongside the raceway means, since the size of the latter does not allow them to be housed therein. Depending on needs, they are arranged either at any point along the raceway means, or at a terminal end of the raceway means, which may be front or lateral, with it being possible to use one or the other simultaneously.

REFERENCE TO THE PRIOR ART

In one known embodiment, these electrical mechanisms are installed with their surface box, a hole being made in the latter for the passage of the conductors from the raceway means, mating with another hole formed in the near wall of the raceway means base section.

In other cases, devices have been developed to rationalize and facilitate the connection of the raceway means conductors to an electrical mechanism in a way which allowed the regulation governing electrical installations to be fulfilled.

Among them, there may be cited the devices disclosed in Spanish utility models U9001305 and U9001306, in which a housing is formed for the electrical mechanism by two stackable enclosures, the lower one of which is open on one side thereof to form two guide edges for slidingly fitting bridge members for connection to the raceway means. In the former model the bridge member is formed by the association of two half frames of equal length and different height, connected together by respective partition walls defining external sliding slots for the member in the lower enclosure opening, while each half frame is provided with similar internal slots for the sliding fit of companion half frames, with all the half frames having outwardly sloping perimetral protusions. In the latter model, the bridge member is provided on one side with slots for sliding engagement in the lower enclosure opening, while it is provided on the other side with a cantilever which directly or by projection covers the lid of the raceway means over a length equal to that of the enclosure side, with filling inserts being inserted between said lid and said protusion. In this model, an opening has to be made in the corresponding raceway means wall.

SUMMARY OF THE INVENTION

These devices are hard to mount in the installations, require a multiplicity of parts, the passage points of the cables from the raceway means to the electrical mechanism are insufficiently insulated relative to the mounting surface, have a horizontal engagement slot between the two enclosures and there is no engagement between the cantilever member and the raceway means, whereby the existing problems are not solved and the said regulation is not satisfactorily fulfilled.

It is an object of the invention to overcome the above described drawbacks. This object is achieved with a device of the type mentioned at the beginning, which comprises; a support member; a casing; and a closing and covering member, so that: said support member: (i) is adapted to be attached to a support surface; (ii) is provided with a base for receiving an electrical mechanism; (iii) comprises side surfaces, one of which is a recessed surface, for the access of conductors from said raceway means to said base; (iv) and is provided with first means for coupling said support member to said casing; said casing: (i) is of generally prismatic shape defining side surfaces; (ii) is adapted to be disposed around said support member and said electrical mechanism; (iii) is provided with second means for coupling said support member with said casing and which are adapted to engage with said first means; and (iv) has, on one of said side walls, a bight defining first edges and which is adapted to be opposite said recessed surface; and said closing and covering member has: (i) a wall portion defining second edges and which is adapted to be attached to said first edges, closing said bight; and (ii) a hood portion adapted to cover a portion of said raceway means.

BRIEF DESCRIPTION OF THE DRAWING

Further advantages and features of the invention will be appreciated from the following description in which there is disclosed, without any limiting nature, a preferred embodiment of the invention, with reference to the accompanying drawings, in which.

DETAILED DESCRIPTION OF THE INVENTION

Figure 1A:
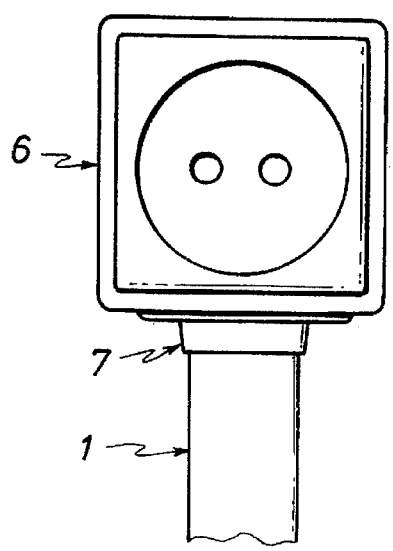
FIG. 1A is a schematic plan view of one embodiment of the device for adapting an electrical mechanism to a raceway means, the device facing the end of the raceway means.

The device of the invention, as stated above, is particularly applicable to small section raceway means 1, formed by a base section 2 and by a lid section 3. On each side wall the base section 2 is provided with a longitudinal groove 4 for engaging and retaining the lid section 3, which is provided with two inwardly directed lips.

The device comprises a support member 5 for an electrical mechanism, a casing 6 and a closing and covering member 7, 7a which may be engaged between the casing 6 and the raceway means 1. In the ways of adaptation of FIGS. 1B and 1C, the device also comprises a guide member 8.

Figure 3:
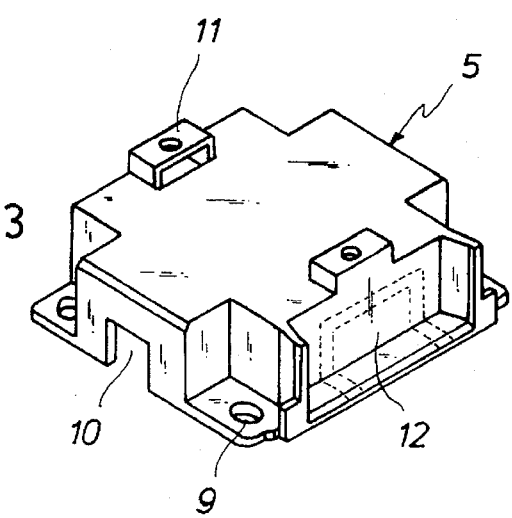
FIG. 3 is a perspective view of the support member portion of the device.

The support member 5 (FIG. 3) is for mounting on a support surface, such as may be a wall, the floor, a column, etc. To this end, it is provided with means for facilitating such mounting, such as holes 9 for screws or the like.

To receive the electrical mechanism, it is provided with a base and preferably lateral seats 11 provided with holes for the passage of screws or the like allowing the electrical mechanism to be attached. Side walls extend from the edges of the base and preferably in two of these opposite side walls there are windows 10, the respective upper edges of which constitute first coupling means of the support member 5 to the casing 6.

One of the side surfaces is a recessed surface 12 having markings (shown dashed); further reference will be made to the recessed surface 12 later on.

Figure 2:
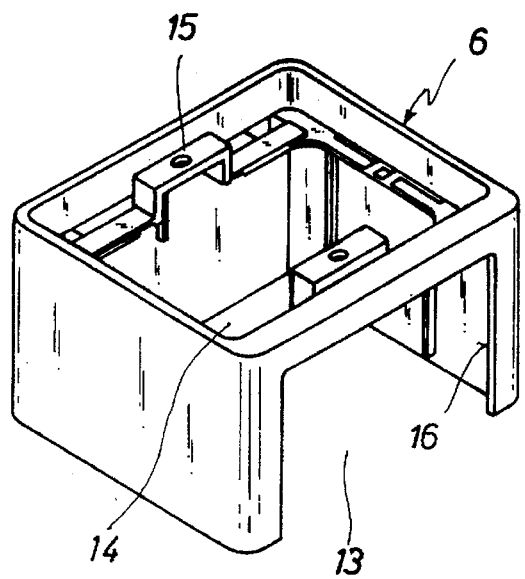
FIG. 2 is a perspective view of the casing portion of the device.

The casing 6 (FIG. 2) in the assembled position is disposed around the support member 5 and the electrical mechanism attached to the latter. It is of prismatic shape and has no base walls. It therefore defines side walls, one of which has a bight 13 provided with first edges 16.

The side walls adjacent the one having the bight 13 are internally provided with second, conventional (not shown), coupling means which are inserted in the windows 10 and are retained by the said upper edges of the windows 10.

After the electrical mechanism has been inserted, the open side 14 is covered with a cover which usually forms part of the mechanism itself and this cover may be held in place by engagement with the projections 15, preferably provided with holes.

In the assembly position, the bight 13 is opposite the recessed surface 12 of the support member 5, thereby leaving a space making it possible for the conductors from the raceway means 1 to pass through to the base of the support member, where there is the electrical mechanism to be adapted.

The closing and covering member 7, 7a comprises a wall portion 17 engageable in the bight 13 of the casing 6. To this end, the second edges of the member 7, 7a are provided with locking tabs 18 engageable with the said first edges 16. It also comprises a hood portion 19, 20 which, in the assembly position, covers a portion of the raceway means 1.

Figure 4:
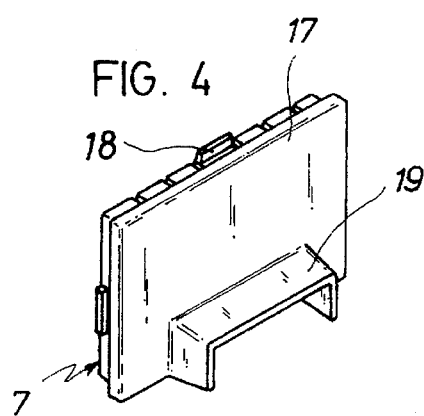
FIG. 4 is a perspective view of one embodiment of the closing and covering member.

In the FIG. 4 embodiment, the hood portion 19 comprises a main wing extending substantially perpendicularly to the wall portion 17 and two side wings bounding the main wing extending from the side edges of the latter. In the assembly position of FIG. 1A, the main wing covers a portion of the raceway means 1, while the side wings cover a portion of the walls of the raceway means 1, which means that the side wings are spaced apart by a distance approximately that of the width of the raceway means.

Figure 5:
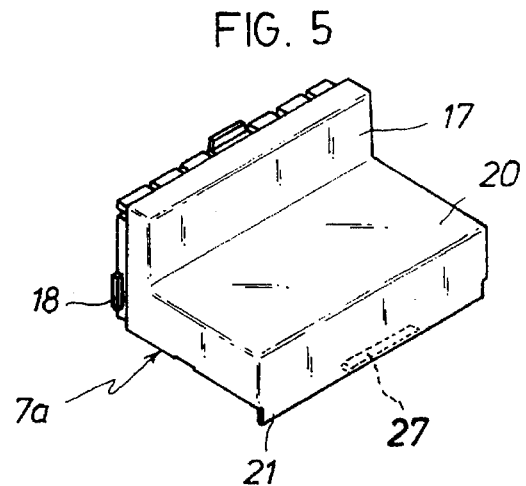
FIG. 5 is a perspective view of another embodiment of the closing and covering member.

In the FIG. 5 embodiment, the hood portion 20 comprises a main flange which also extends substantially perpendicularly from the wall portion 17. Respective side flanges extend from the side edges of the main flange and from the front edge, remote from the wall portion 17, there extends a skirt 21. A tooth 27 is located on the free edge of this skirt. In the assembly position, the side flanges bear transversely on the raceway means 1, while the skirt 21 engages one of the side walls of the raceway means 1 and the tooth 27 is retentively inserted in the longitudinal groove 4 of such said wall.

Figure 1B:
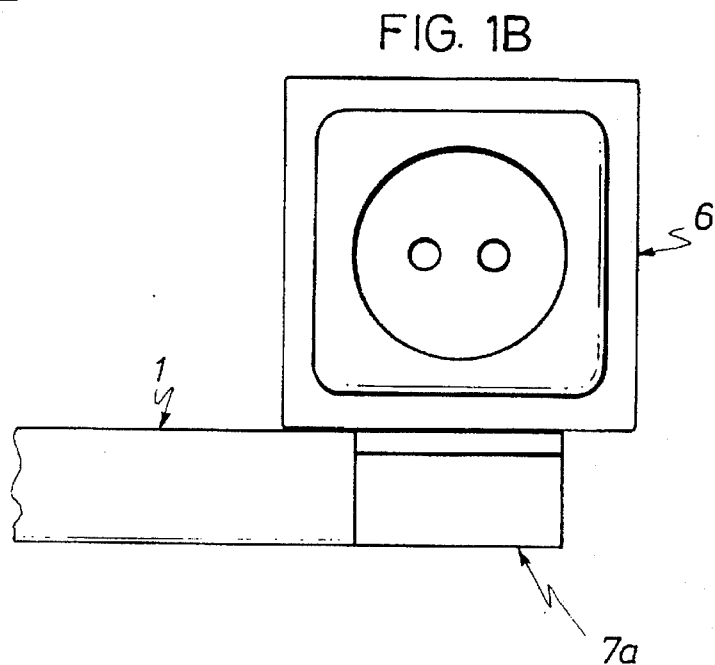
FIG. 1B is a similar view to the previous one, with the device applied to the side of one end of the raceway means.
Figure 1C:
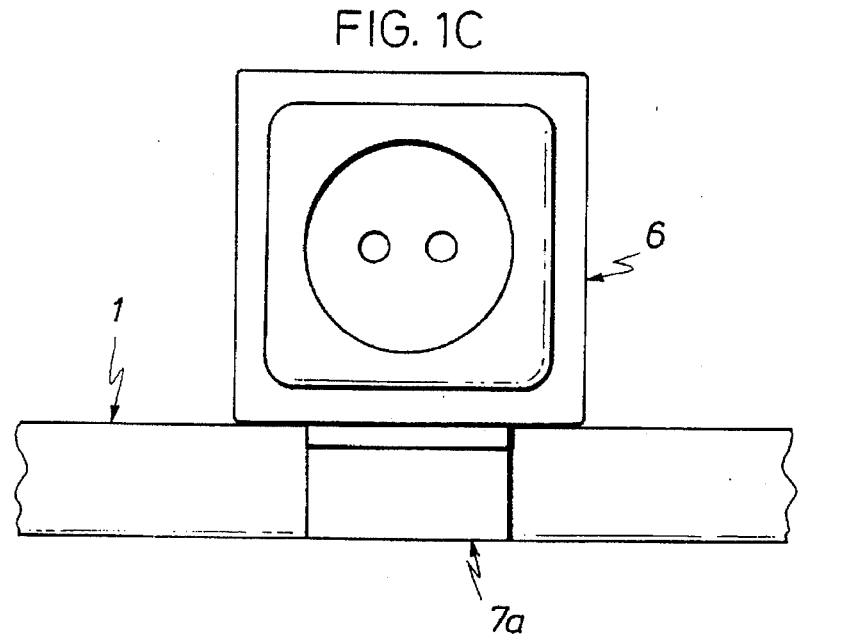
FIG. 1C is a similar view to the two previous ones, with the device applied laterally to an intermediate point of the raceway means.
Figure 6:
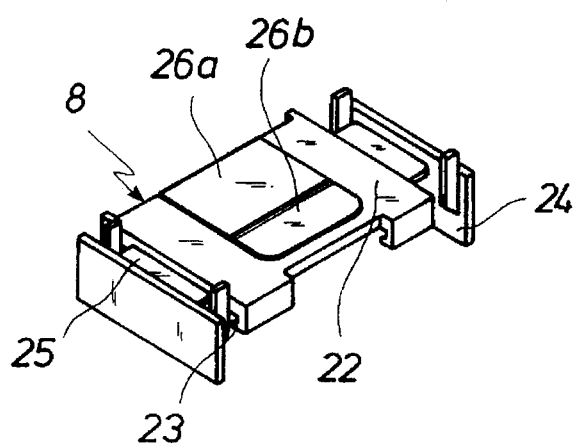
FIG. 6 is a perspective view of the guide member.

For the cases illustrated in FIGS. 1B and 1C, the device also comprises a guide member 8 (FIG. 6), having a rectangular base 22 for covering a portion of the base section 2 of a raceway means 1, the base being inserted between two lengths of lid section. The base 22 is provided with retaining teeth 23, capable of being inserted in the grooves 4 of the base section 1 of the raceway means.

Figure 8:
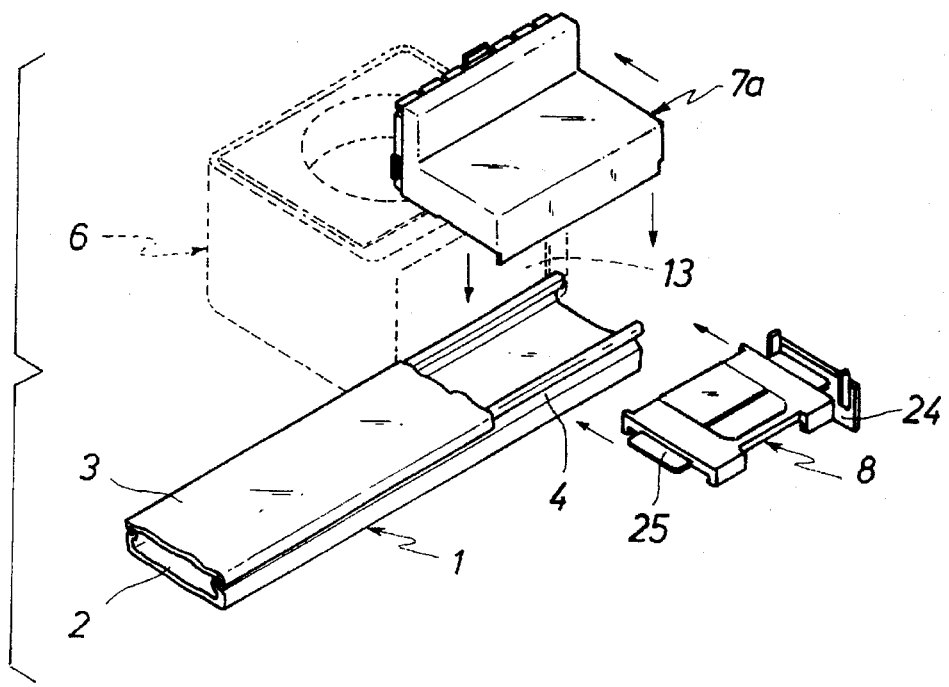
FIG. 8 is an exploded perspective view, similar to the previous one, relative to the way of assembly of the device in FIG. 1B.
Figure 9:
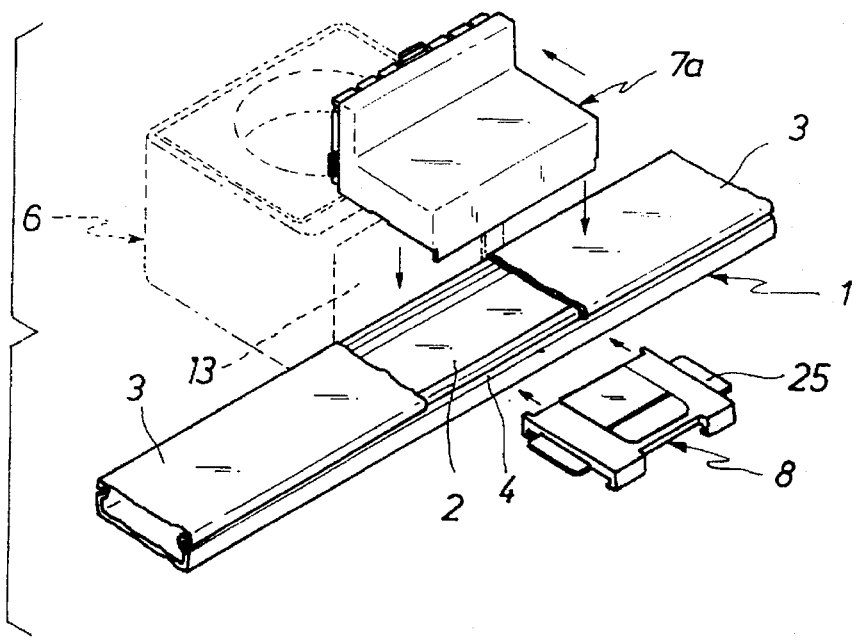
FIG. 9 is an exploded perspective view, similar to the previous two, relative to the way of assembly of the device in FIG. 1C.

The guide member 8 is provided with longitudinal fins 25 projecting outwardly from the ends of the member 8 and which in the assembly position are covered by the lengths of lid section 3. End plates 24 are attached to the fins 25, by a weak joint, allowing one (FIG. 8) or both (FIG. 9) of them to be removed.

Likewise, the base 22 is provided with one or more areas 26a and 26b formed by removable sheet-like portions which, when removed, allow the electric cables to pass from the raceway means 1 to the base of the support member 5.

Figure 7:
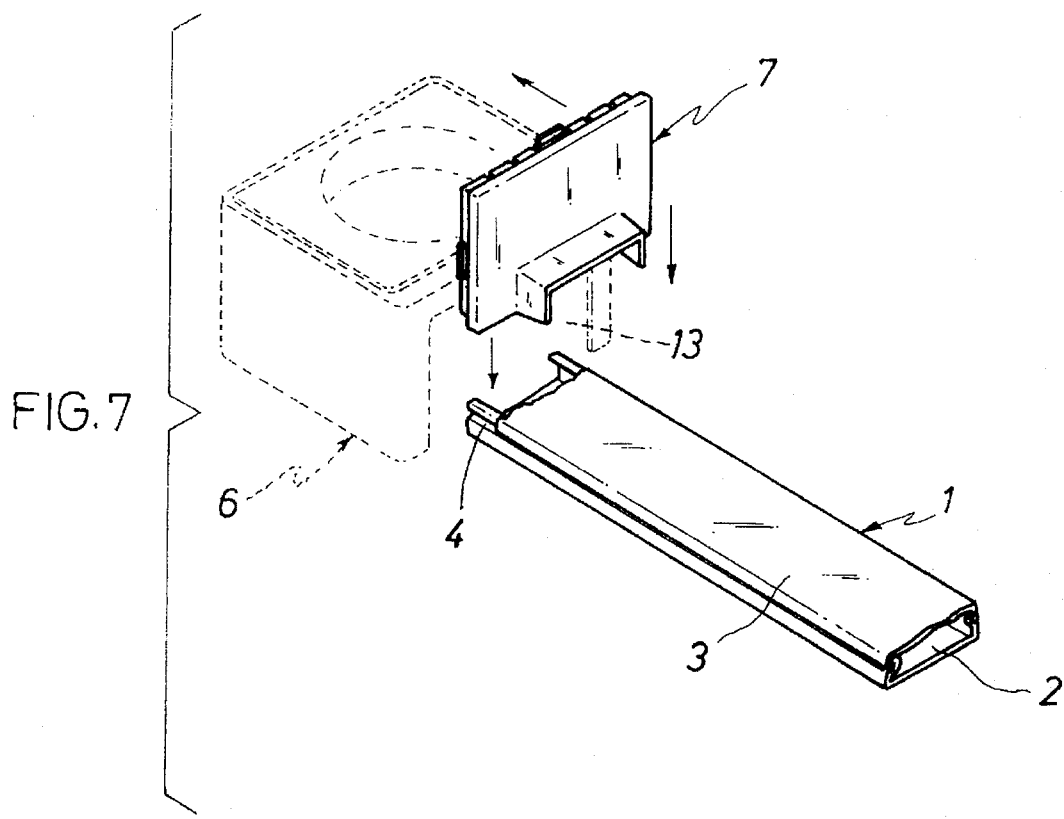
FIG. 7 is an exploded perspective view, relative to the way of assembly of the device in FIG. 1A, with the casing shown in phantom line and containing therein the support member and an electrical mechanism.

In the case of the assembly as per FIG. 1A (FIG. 7), the parts to be fitted are arranged in such a way that, once the support member 5 has been fixed in place, there is added thereto the casing 6 and the closing and covering member 7 is connected to the casing 6 by the side bight 13, being held therein by engagement of the teeth 18 with the first edges 16 of the casing 6. The end portion of the raceway means 1 is covered by the wings of the hood portion 19. The conductors from the raceway means 1 pass into the casing 6 and reach the electrical mechanism to be adapted, passing through the space formed between the recessed surface 12 of the support member 5 and the bight 13 of the casing 6.

In the assembly of FIG. 1B (FIG. 8), the guide member 8, from which one of the end plates 24 has to be removed, is required, so that the remaining plate closes the free end edge of the raceway means 1. In this case, the fin 25 from which the end plate 24 has been removed, is inserted under the lid section 3 of the raceway means 1. The guide member 8 is covered by the hood portion 20 of the closing and covering member 7a. One or more of the areas 26a and 26b will be removed from the guide member 8, depending on the needs of passage of conductors.

In the case of the assembly of FIG. 1C (FIG. 9), the same parts as for the FIG. 1B case are used, although in this case the guide member 8 must have both end plates 24 removed therefrom. Thus, the two fins 25 of said guide member 8 are inserted under the two cut ends of the lid section 3 of the raceway means 1, with the hood portion 20 of the closing and covering device 7a covering the cut zone. As in the previous case, the guide member 8 will have one or more areas 26a and 26b removed, to allow passage for the conductors.

From the above described assembly options, there will be appreciated the favorable conditions of adaptability of the device to each circumstance concerning the position of the device relative to the raceway means, with regard to the way of applying the pertinent electrical mechanism, with the electrical conductors always being covered and insulated relative to the mounting surface.

What I claim is:

1. A device for adapting an electrical mechanism to a raceway means for electrical conductors, particularly to a raceway means formed by a base section having a bottom wall and side walls having respective longitudinal grooves, and by a lid section having two inwardly directed lips for engagement in said longitudinal grooves, the device comprising:

a support member;
   a casing;

a closing and covering member; and a guide member, wherein said support member is adapted to be attached to a support surface; is provided with a base for receiving an electrical mechanism; includes side surfaces, one of which is a recessed surface, for the access of conductors from said raceway means to said base; and is provided with first means for coupling said support member to said casing;

wherein said casing is of substantially prismatic shape defining side surfaces; is adapted to be disposed around said support member and said electrical mechanism; and (iii) has, on one of said side surfaces, a bight defining first edges and which is adapted to be opposite said recessed surface;

wherein said closing and covering member has a wall portion defining second edges and which is adapted to be attached to said first edges, closing said bight; and a hood portion adapted to cover a portion of said raceway means, wherein said guide member includes a rectangular base provided with removable sheet-like portions and adapted to cover a portion of said base section, said guide member also includes retaining teeth that may be inserted in said longitudinal grooves of the side walls of the raceway means, longitudinal fins that may be located below portions of said lid section that are adjacent said portion of said base section, and end plates attached to said longitudinal fins with weakened joints.

2. The device of claim 1, wherein said support member has means for holding said electrical mechanism.

3. The device of claim 2, wherein said holding means comprise lateral seats provided with holes for the passage of fasteners.

4. The device of claim 1, wherein said first coupling means are formed by windows situated in opposite side surfaces and which define respective upper retaining edges.

5. The device of claim 1, wherein said second edges of said wall portion of said closing and covering member are provided with locking tabs adapted to engage said first edges of said bight of said casing.

6. The device of claim 5, wherein said hood portion of said closing and covering member comprises a main wing: extending from said wall portion, defining two side edges; which is adapted to cover a portion of said raceway means; and which is bounded by two side wings extending from said side edges and which are adapted to cover portions of said side walls of said raceway means.

7. The device of claim 5, wherein said hood portion of said closing and covering member comprises a main flange: projecting outwardly from said wall portion, defining two side edges and a front edge; which is bounded by two side flanges extending from said side edges and which are adapted to engage said raceway means; and which is extended by a skirt extending from said front edge; said skirt having a tooth adapted retentively to engage one of said longitudinal grooves of the side walls of the raceway means.

* * * * *